United States Patent [19]
Hodgetts

[11] Patent Number: 5,346,786
[45] Date of Patent: Sep. 13, 1994

[54] MODULAR RACK MOUNTED BATTERY SYSTEM

[76] Inventor: Philip J. Hodgetts, 16041 Burgess Cir., Westminster, Calif. 92683

[21] Appl. No.: 216,176

[22] Filed: Mar. 21, 1994

[51] Int. Cl.$^5$ .............................................. H01M 6/48
[52] U.S. Cl. ..................................... 429/159; 429/99; 429/121; 429/210
[58] Field of Search .................... 429/159, 210, 1, 121, 429/152, 99, 178, 156, 157, 158

[56] References Cited

U.S. PATENT DOCUMENTS 4,239,840 12/1980 Puri ....................................... 429/159
4,687,717 8/1987 Kaun et al. ....................... 429/210 X
4,734,342 3/1988 Seiger .................................. 429/152

Primary Examiner—Anthony Skapars
Attorney, Agent, or Firm—Hawes & Fischer

[57] ABSTRACT

A modular battery rack system consists of a series of bi-polar cells having individualized connections for monitoring, charging, discharging, and electrical illumination of weak or damaged cells. Each bi-polar cell has a first surface and a second surface with the first surface being configured to interlock with the second surface of an adjacent cell. The configuration consists of a series of raised ribs on the first plate which interfit with a series of elongated indentations on the second surface of an adjacent cell to prevent the improper installation of a cell.

15 Claims, 3 Drawing Sheets

MODULAR RACK MOUNTED BATTERY SYSTEM

FIELD OF THE INVENTION

The present invention relates to the field of structures which utilize and electrically engage battery cells, and more particularly to a modular battery rack system in which battery charging, discharge, interchangeability, and monitoring is facilitated.

BACKGROUND OF THE INVENTION

Electrochemical cells, batteries, have existed in a wide variety of physical configurations for an even wider variety of uses. The physical characteristics of battery housings have been dictated by a plethora of oftentimes conflicting considerations, including size, weight, interchangeability, and physical conformance to the devices into which they fit. In the case where batteries are sought to be employed to power electrical vehicles, the higher voltages needed for powering automotive electric engines dictate a larger number of individual cells. The problems associated with the utilization of a large number of cells in series in the automotive environment are many. For example, in U.S. Pat. No. 4,734,342 which issued on Mar. 29, 1988 to Harvey N. Seiger, entitled "Terminal Means For Electrochemical Cells," it is reported that the current distribution pattern in a group of series connected batteries approaches an elliptical profile. The result is an uneven or non-uniform current distribution through the cell and, consequently, non-uniform active metal consumption over the areas of the bipolar electrodes.

Another problem is the "dead," or open-circuited cell. As cells are discharged and recharged, the growth of the electrodes may be such that an electrical open circuit is formed across the plates of a bipolar cell. When this occurs in a single cell of a 6 cell, 12 volt battery, the entire battery must be discarded. The concomitant discarding of the other five functioning cells. In the case of an electric vehicle, the dead cells causing the dead battery necessitates an immediate replacement. However, most electric car operators are not immediately equipped to change the dead battery in the event of a failed cell. Even in cases where the non-working battery could be replaced, the liability relating to the weight of transporting a spare 12 volt battery would significantly reduce the efficiency and range of the electric vehicle.

Admittedly, a series of 12 volt batteries employed in an electrical vehicle could be charged one at a time, but this would not only be onerous and burdensome, but the charging of any one cell or group of cells, without regard to the state of other cells, will not enable the true control of charging.

The use of stacked cells is also well-known in the battery art, but generally offers very limited flexibility and the ability to handle the needs of individual cells, and to control the individual cells on an individual basis. For example, U.S. Pat. No. 5,002,841 to Belongia et al., which issued on Mar. 6, 1991 and entitled "Composite End Block For A Battery" disclosed a series of exterior alternating separators to form a stack of electrochemical cells. A lightweight deflection-resistant end block was provided in an attempt to form an overall sealed mass.

U.S. Pat. No. 4,687,717 issued to Kaun et al. on Aug. 18, 1987 and entitled "Bi-Polar Battery With Array of Sealed Cells" discloses a gas-tight housing compressibly enclosing a series of horizontally disposed cells. U.S. Pat. No. 3,844,841 to Bernard Baker which issued on Oct. 29, 1974 and entitled "Modular Battery Construction" discloses packs of wafer-like battery cells fitted within an overall housing which may be fitted adjacent similarly-shaped and housed sets of wafer cells. The wafer cells are wired together, and have internal wiring extending between circular metallic electrode connectors. U.S. Pat. No. 438,827 to E. N. Reynier, issued on Oct. 21, 1890 and entitled "Secondary Battery" also discloses a rigid box for holding a series of vertically disposed battery cells. U.S. Pat. No. 4,189,528 to Ronald I. Clutwick on Feb. 19, 1980 and entitled "Power Module Assembly" again disclosed a very closely stacked array of cells, but utilizing a sealed bag pressure device to ensure close compression of the cells.

In all the foregoing battery configurations, there is no provision made for rapid interchange of dead, open-circuited cells. Reynier illustrates some parallel connection of the individual cells, no provision is made for selective disengagement of any one cell, either electrically or physically, from the main battery array.

Further, the above patented designs are not advantageous in electrical vehicle use, and particular as a use for retrofit with regard to an electrical vehicle conversion from a fossil fuel burning vehicle. Current configurations for electric vehicles require the purchase a plurality of 6 or 12 volt batteries to provide the 72 to 120 or more volts of electricity necessary to power the vehicle. These batteries are then connected in series with heavy electrical cables. The batteries are then charged and discharged in series through the system of heavy cables, requiring a long charging time. In this configuration, the batteries must be carefully matched in order to derive the most efficiency from the system. The weakest battery, actually the weakest cell, in the series determines the degree to which the system can be charged or discharged. If a single battery and its multiple cells is replaced, the new battery can contribute no more to the system than the weakest battery remaining in the system. The batteries when configured in series as outlined, must be maintained at a nearly full charge condition to extend their operating life. If the batteries are allowed to stand for any length of time in a discharge state, they will rapidly deteriorate.

These factors are especially applicable to the deepcycle lead acid battery. The lead acid battery is the battery of choice in the electrical vehicle applications because of its self-containment, mass production abilities, reliability and inexpensiveness.

Both the references pointed out above, and the standard lead-acid batteries are typically not specifically optimized for electric vehicle usage. Rapid replacement of individual cells in both configurations is prohibitive. There is no means for charging individual cells when the system is under load. The weakest cells in the system configuration are not amenable to a trickle charge to take account of cell weakness. Lastly, rapid charge of the cells can not be had without significant un-wiring of the cables or other changes in wiring.

What is therefore needed is an electric vehicle battery system which enables as many advantages from other battery systems to be employed in order to make the system practical and highly useable. The desired system should have individual cells which may be accessed, changed, monitored, individually charged, and, if necessary, individually discharged.

SUMMARY OF THE INVENTION

The present invention is a modular battery rack system consisting of a series of bi-polar cells having individualized connections for monitoring, charging, discharging, and electrical illumination of weak or damaged cells. Each bi-polar cell has a first surface and a second surface with the first surface being configured to interlock with the second surface of an adjacent cell. The configuration consists of a series of raised ribs on the first plate which interfit with a series of elongated indentations on the second surface of an adjacent cell. This physical configuration prevents the improper installation of a cell.

A microprocessor monitor is used to continually access the characteristics of each cell, both current and past voltage levels, in order to identify problems and to switch the electrical conductivity of the cells both in terms of charging and discharge.

Each individually removable cell is held in place in a rack having a spring loaded pressure plate and tightening bolt in order to ensure that the cells are compressibly held together. With the computer control and monitoring of the present invention, the carriage of a single additional cell should be sufficient for emergency or back up service. The rigid cell construction facilitates the cell type, which can be virtually any type cell including nickel iron, nickel cadmium, lead acid, and gaseous cells.

BRIEF DESCRIPTION OF THE DRAWINGS

The invention, its configuration, construction, and operation will be best further described in the following detailed description, taken in conjunction with the accompanying drawings in which.

DETAILED DESCRIPTION OF THE PREFERRED EMBODIMENTS

Figure 1:
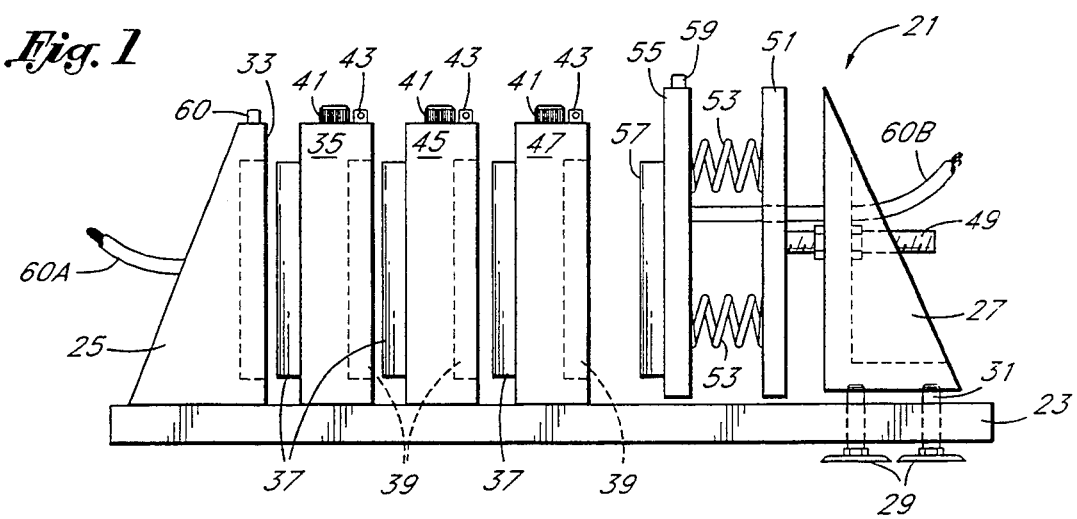
FIG. 1 is a side view illustrating the battery rack and cell system of the present invention including a series of cells in their relationship to the rack.

Referring to FIG. 1, a side view of the battery rack 21 illustrates a non-conductive base 23 vertically supporting a pair of oppositely disposed, "bookend" shaped supports, including fixed support 25 and adjustable support 27. Adjustable support 27 engages base 23 with one or more downwardly extending pegs 29 engaging corresponding keyhole slots 31 in base 23. At the left of FIG. 1 adjacent to fixed support 25 is a thin support plate 33 which forms the left most electrical connection in the battery rack 21 of FIG. 1. Support plate 33 may have either a planar surface, or may have a specialized surface to maximize the electrical contact between itself and the battery cell which it is adjacent, as will be shown. Support plate 33 is illustrated adjacent a battery cell 35. Battery cell 35 includes an outwardly projecting plate portion 37 and an inward plate surface 39 represented by a dash line shown within the confines of battery cell 35. Although not visible in FIG. 1, support plate 33 contains one or more inward portions which match with the outwardly projecting plate portion 37 of battery cell 35. Atop battery cell 35 is a filler and safety relief cap 41, and a connection terminal 43. Connection terminal 43 has the same electrical potential as inward plate surface 39. The purpose of the electrical connection terminal 43 is to enable electrical connections to the battery cells 35 to be made without the need to physically separate the battery cells 35 or to insert any conductors there between. The connection terminal 43 will be of sufficient size and cross-sectional area to permit charging or discharging of the current into, or out of, respectively. Other adjacently located battery cells, namely battery cells 45 and 47, are shown in a non-engaging position in order to be able to clearly observe their outwardly projecting plate parts 37.

Referring to the adjustable support 27, it supports a tightening bolt 49 which is connected to a pressure plate 51. Pressure plate 51 also engages adjustable support 27 via surface contact and with regard to the tightening bolt 49. Pressure plate 51 is mechanically attached via springs 53 to a conductor 55 which has an outwardly projecting part 57 having the same size and shape and electrical characteristics as outwardly projecting plate parts 37 of battery cells 35, 45 and 47. Conductor 55 is also fitted with a connection terminal 59 of the same shape and type which were mounted upon the battery cells 35, 45 and 47.

A large amperage conductor 60A extends from the battery rack 21 and is connected to support plate 33. Similarly, a large amperage conductor 60B extends from the battery rack 21 and is connected to connection terminal 59.

As can be seen, when a sufficient number of battery cells 35, 45 and 47 are loaded into the battery rack 21 adjacent each other, they may be pressed together causing the outwardly projecting plate parts 37 of a given battery cell 35 to engage the inward plate surface 39 of adjacent battery cell. The tightening bolt 49 can be used to engage springs 53 against pressure plate 51 and conductor 55. The spring tension will always be utilized to enable the battery cells 35, 45 and 47 to expand slightly if such is necessary, but generally to keep up the tension despite vibration and movement forces.

Figure 2:
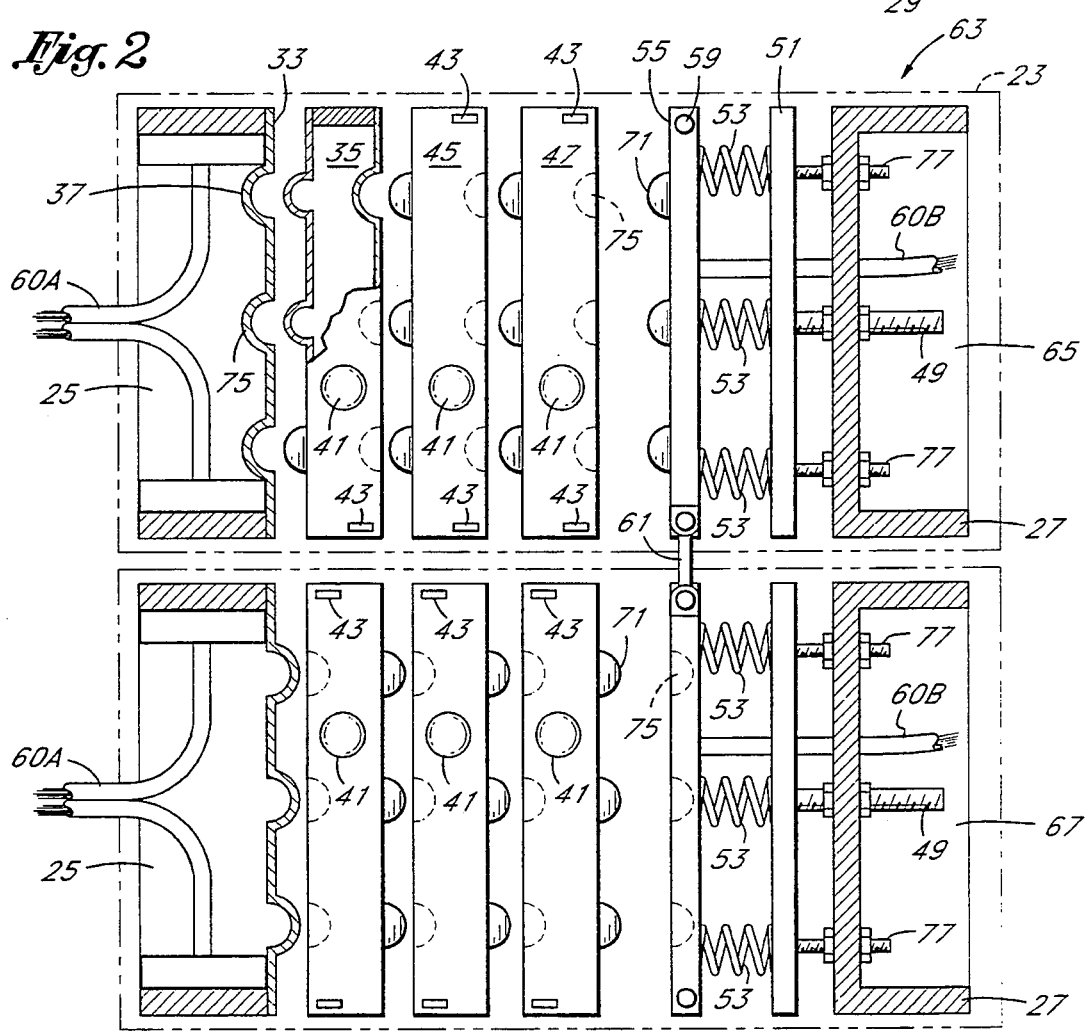
FIG. 2 is a top view of the battery rack and cell system shown in FIG. 1 and illustrating a duel side by side construction to facilitate series connection in a limited length area.

Referring to FIG. 2, a top view of the battery racks 21 of FIG. 1 illustrates a side by side relationship and oriented to provide a near connection through a bus bar 61 to eliminate an elongated connection which are necessary to enable series operation. The configuration of FIG. 2 also illustrates that the structure shown in FIG. 1 can be oriented in either direction with respect to fixed support 25 and adjustable support 27. The configuration shown in FIG. 2 is a side by side battery rack set 63 including a first battery rack 65 having a configuration identical to that shown in FIG. 1, and having a second battery rack set 67 having a configuration opposite to the battery rack 21 shown in FIG. 1.

With regard to first battery rack 65 and directing attention to the upper left side of FIG. 2, the outwardly projecting plate part 37 of battery cell 35 is shown to include a series of three vertically extending, outwardly projecting ribs 71. It is understood that large or small projecting ribs 71 may be employed and in greater or lesser numbers than three. As can be seen with regard to battery cell 35, the vertically projecting ribs 71 complimentarily engage a series of vertical trough depressions 75 which are formed in support plate 33.

Vertical projecting ribs 71 are also provided on the same side of each of the battery cells 35, 45 and 47. At the far right side of first battery rack set 65 in FIG. 2, it can be seen that the conductor 55 supports a set of vertically extending projecting ribs 71 identical to the vertically extending projecting ribs 71 shown on the battery cells 35, 45, and 47. Likewise, the inward plate surface 39 of FIG. 1 can now be seen to be a series of vertically extending trough depression 75 which match the depth and shape of the vertically extending projecting ribs 71. Vertically extending trough depressions 75 exist on each of the battery cells 35, 45, and 47. There is also a set of vertically extending trough depressions 75 on the support plate 33 at the upper left portion of FIG. 2.

Second battery rack 67 differs from first battery rack set 65 in that it is the support plate 33 which contains vertical projecting ribs 71, while the pressure plate 51 contains the vertical trough depressions 75. Bus bar 61 joins the two pressure plates 51. It is understood that the vertically extending projecting ribs 71 may not necessarily extend the whole vertical length of the battery cell 35, 45, or 47, but that it is preferred for the vertically extending trough 75 to extend to the maximum vertical extent to enable easy vertical removal of a battery cell 35, 45, or 47.

As can also be seen in FIG. 2, the adjustable supports 27 may be provided with a pair of guide pins 77, to steady the orientation of the adjustable support 27 and perhaps to ease the translational motion of the pressure plate 51.

Figure 3:
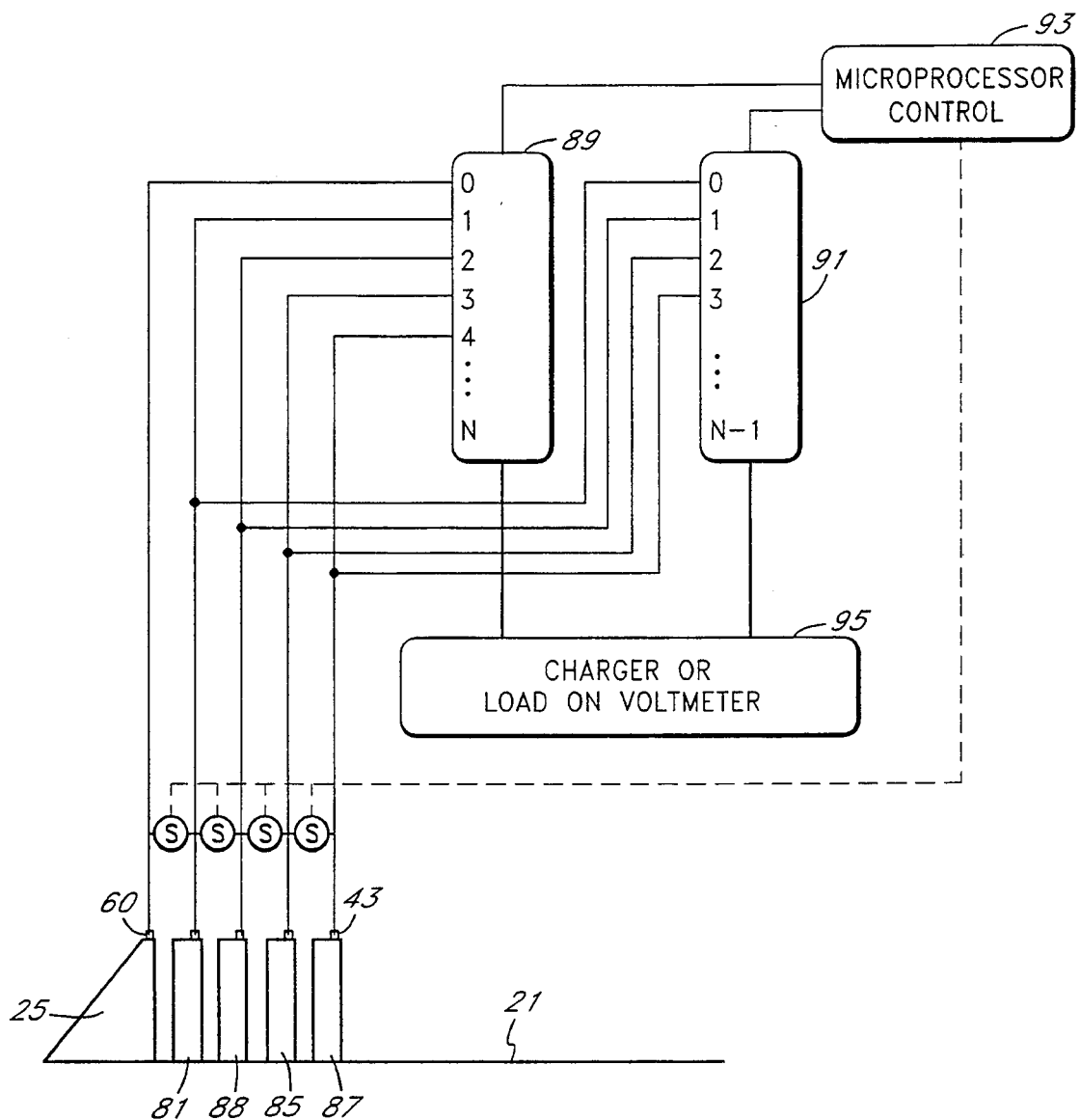
FIG. 3 is a circuit diagram illustrating selectable multiplexed availability of the cells shown in FIGS. 1 and 2, and any combination, to a electrical charger or electrical load.

Referring to FIG. 3, a simplified schematic diagram illustrating the left hand portion of the battery rack 21 of FIGS. 1 and 2 illustrates the basis for a schematic diagram in which one charging/discharge scheme is depicted.

A series of battery cells 81, 83, 85 and 87 are supported within battery rack 21. The battery cells 81, 83, 85 and 87 are shown somewhat displaced from each other only for schematic reasons, in order that discussions same is facilitated. Fixed support 25 and its connector terminal 60 is connected to terminal 0 of a multiplexer 89. Connection terminal 43 of battery cell 81 is connected to terminal 1 of multiplexer 89 and to terminal 0 of multiplexer 91. Likewise, connection terminal 43 of battery cell 88 is connected to terminal 2 of multiplexer 89 and to terminal 1 of multiplexer 91. Likewise, connection terminal 43 of battery cell 85 is connected to terminal 3 of multiplexer 89 and to terminal 2 of multiplexer 91. A microprocessor control 93 is independently connected to multiplexers 89 and 91. It is understood that the microprocessor control 93 could be connected to multiplexers 89 and 91 in parallel, however, such would enable the multiplexers 89 and 91 only to access a single one of the battery cells 81, 83, 85 and 87, etc. for a given generated address. The wiring of the multiplexers 89 and 91 are purposefully shown connected in a staggered fashion to illustrate that if the microprocessor control 93 were connected on the same conductor to both of the multiplexers 89 and 91 simultaneously, that only one of the battery cells 81, 83, 85, 87, etc. could be accessed at one time.

With the independent control lines extending from the microprocessor control 93, and again assuming that the microprocessor control 93 is properly programmed, any combination of connection terminals 43 can be made available through the multiplexers to a block entitled charger or load in which will be designated terminus block 95. In this case terminus block has a pair of leads, presumably one of which will be negative and one of which will positive. For example, if microprocessor control 93 were to trigger multiplexers 89 and 91 to input their respective terminals 1 to their respective outputs, and thus to terminus 95, the voltage across battery cell 83 would be made available to the terminus 95. In the event that the terminus 95 is a charger, battery cell 83 would then be charged. In the event that terminus 95 is a load, electrical energy can then flow from battery cell 83 into terminus 95. Terminus 95 may also be a volt meter, in which case the voltage across battery cell 83 can now be measured.

If however the microprocessor control 93 accesses the multiplexers 89 and 91 differently, different groups of cells and series can be accessed. For example, if multiplexer 89 is directed to its "zero" address while multiplexer 91 is directed to its "third" address, the terminus 95 will access the series combination of battery cells 81, 83, 85, and 87 through the terminal connected 43 of battery cell 87 and through the terminal connection 60 of fixed support cell 25. In this manner, any number of consecutively connected battery cells can be accessed.

Note the set of switches labeled "s" which extend between each of the set of connections between the battery cells 81, 83, 85, and 87 and the multiplexers 89 and 91. In the event that a cell fails in the open circuit mode, one of the switches "s" can be closed to enable current to flow through the switch, without having to remove a single cell. This is beneficial, especially where the microprocessor control 93 determines that a single cell is so weak that the system could function more efficiently without it. The switches "s" may be automatically controlled by the microprocessor control 93 as is shown by a dashed line connection.

Referring to FIG. 4, a top view of several cell configurations is illustrated. The purpose for angling the cells is to provide a more sturdy self-standing orientation, so that the cells will be less likely to fall over when standing freely. It is understood that each configuration would be supported in a battery rack 21 having a conductor 55 and support plate 33 which matches its side shape.

Figure 4A:
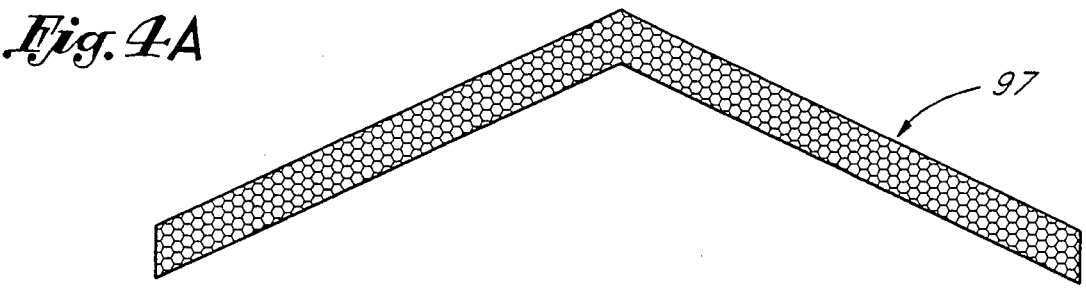
FIG. 4A–4E illustrates top views of alternative battery cell shapes.
Figure 4B:
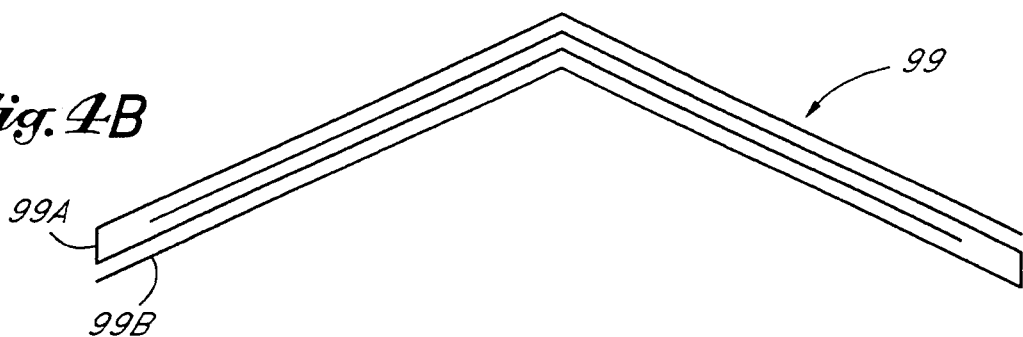

FIG. 4A illustrates a chevron shaped battery 97 in which one side is formed as an obtuse angle about a vertical axis. The poles of the battery will be different by their overall shape and will be almost impossible to inadvertently reverse the polarity. One pole will form a convex obtuse angle about a vertical axis, and the other pole will form a concave obtuse angle about a vertical axis. FIG. 4B illustrates a double density folded chevron battery 99. The double density design consists of a first plate 99A having an overall "U" shape interfitted with a second plate 99B having a "U" shape interfitting the "U" shape of first plate 99A. The obtuse fold is made at the middle of the "U", halfway between the bottom curve and the upper prongs.

Figure 4C:
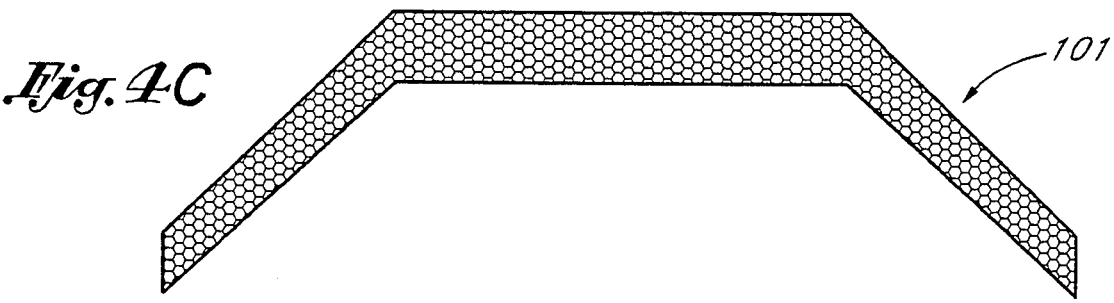
Figure 4D:
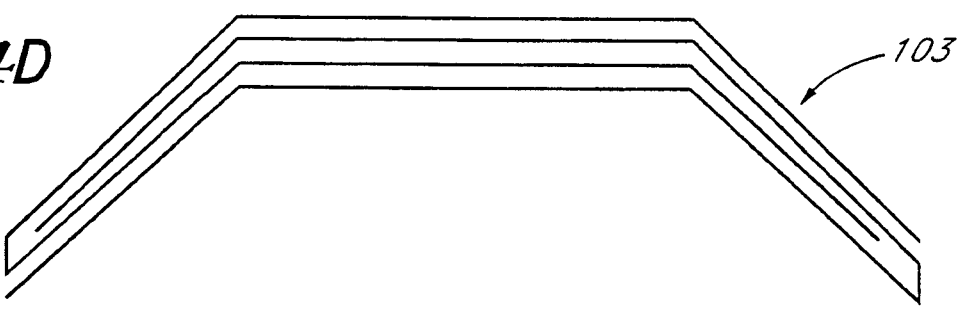
Figure 4E:
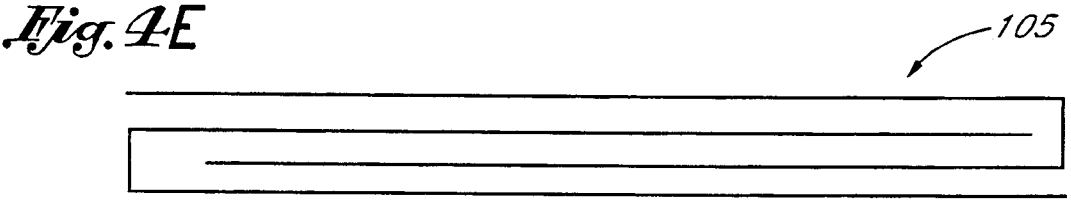

FIG. 4C illustrates a half-hex battery cell 101 which forms half of a shallow hexagon shape. A deeper hexagon shape could be used, however. FIG. 4D is a double density or "folded" half-hex battery cell 103, similar in cell construction to that described for battery cell 99. FIG. 4E illustrates a battery cell 105 in the shape of a nested "U" which is again similar in construction to the cells 99 and 103, but in substantially "straight" form, as were the cells 35, 45 and 47.

While the present invention has been described in terms of a battery support and replacement system, one skilled in the art will realize that the structure and techniques of the present invention can be applied to many appliances. The present invention may be applied in any situation where system components are sought to be rapidly and easily replaced with due consideration to insuring that proper polarity is maintained.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. A battery system comprising:
    means for carrying a plurality of self contained bipolar battery cell units in a serial connected orientation;
    a battery cell unit further comprising:
        a first electrode having a set of extended structures;
        a second electrode having a set of recessed structures complementary to said extended structures;
        a housing supporting said first electrode in an outwardly facing first direction and supporting said second electrode in an outwardly facing direction opposite to that of said first electrode;
        a connection terminal extending normal to said first direction and connected to one of said first and said second electrodes; and
        an electrolyte in contact with said first and said second electrodes and contained by said first electrode, said second electrode and said housing.

2. The battery system recited in claim 1 wherein said means for carrying a plurality of self contained battery cell units in a serial connected orientation is also for carrying a varying number of said self contained battery cell units.

3. The battery system recited in claim 1 wherein said battery cell unit has a fill opening and further comprising a fill cap covering said fill opening.

4. The battery system of claim 1 wherein said means for carrying a plurality of self contained battery cell units in a serial connected orientation further comprises:
    a base having a planar upper surface and defining a plurality of apertures in said planar upper surface;
    a first support engaging said base;
    a second support engaging at least one of said plurality of apertures in said base;
    a pressure plate urgingly movable with respect to one of said first and said second supports, and for engaging one of said first and said second electrodes
    a conductive pressure portion attached to said other of said first and said second supports, and for engaging the other of said first and said second electrodes.

5. The battery system of claim 1 wherein said means for carrying a plurality of self contained battery cell units in a serial connected orientation further comprises:
    a base having a planar upper surface and defining a plurality of apertures in said planar upper surface;
    a first support engaging said base;
    a second support engaging at least one of said plurality of apertures in said base;
    a pressure plate having one of a set of extended plate structures and a set of recessed plate structures, complementary to one of said set of extended structures and set of recessed structures of one of said first and said second electrodes, said pressure plate urgingly movable with respect to one of said first and said second supports, and for engaging one of said first and said second electrodes;
    a conductive pressure portion having one of a set of extended conductive pressure portion structures and a set of recessed conductive pressure portion structures, complementary to one of said set of extended structures and set of recessed structures of one of said first and said second electrodes, said conductive pressure portion attached to said other of said first and said second supports, and for engaging the other of said first and said second electrodes.

6. The battery system recited in claim 4 wherein said set of extended plate structures and said set of extended structures are a series of vertical ribs, and wherein said recessed plate structures and said recessed structures is a series of vertical trough depressions.

7. The battery system recited in claim 4 wherein said set of extended plate structures and said set of extended structures form a convex obtuse angle about a vertical axis, and wherein said recessed plate structures and said recessed structures form a concave obtuse angle about a vertical axis.

8. The battery system of claim 4 and further comprising a tightening bolt engaging said second support engaging and said pressure plate.

9. The battery system as recited in claim 4 and further comprising a plurality of springs, positioned between said pressure plate and said one of said first and said second supports, to urge said pressure plate away from its respective support.

10. A battery control system including the battery system as recited in claim 1 and further comprising:
    an electrical device having a first terminal and a second terminal;
    a microprocessor control having at least one control output;
    a plurality of said battery cell units connected in series by their said first and second electrodes;
    a first multiplexer having separate connections to the other of said first and second electrodes of one of said plurality of said battery cell units at the end of said series connection, and to the connection terminal of each of said plurality of battery cell units, and to a first terminal of said electrical device, said first multiplexer having a control input connected to said at least one control output of said microprocessor control, said first multiplexer having a switch output connected to said first terminal of said electrical device; and
    a second multiplexer having separate connections to the connection terminal of each of said plurality of battery cell units, and to a second terminal of said electrical device, said second multiplexer having a control input connected to said at least one control output of said microprocessor control, said second multiplexer having a switch output connected to said second terminal of said electrical device.

11. The battery control system recited in claim 10 wherein said microprocessor control has at least a first control output connected to said control input of said first multiplexer and at least a second control output connected to said control input of said second multiplexer such that said first and said second multiplexers can be independently addressed.

12. The battery control system recited in claim 10 wherein said electrical device is a battery cell charger.

13. The battery control system recited in claim 10 wherein said electrical device is an electrical load for consuming electrical power.

14. The battery control system recited in claim 10 wherein said electrical device is a voltmeter.

15. The battery system recited in claim 10 wherein said means for carrying a plurality of self contained battery cell units in a serial connected orientation is also for carrying a varying number of said self contained battery cell units.

* * * * *